United States Patent
Wesley

(10) Patent No.: US 6,394,313 B1
(45) Date of Patent: May 28, 2002

(54) HOUSEHOLD GREASE STORAGE CONTAINER

(76) Inventor: Charles R. Wesley, 988 Copley Rd., Akron, OH (US) 44320

( * ) Notice: Subject to any disclaimer, the term of this patent is extended or adjusted under 35 U.S.C. 154(b) by 0 days.

(21) Appl. No.: 09/949,365

(22) Filed: Sep. 7, 2001

Related U.S. Application Data

(60) Provisional application No. 60/275,458, filed on Mar. 13, 2001.

(51) Int. Cl.[7] ................................................. B67D 5/60
(52) U.S. Cl. .................. 222/131; 222/183; 222/189.07; 210/244; 220/23.87
(58) Field of Search ............................... 222/131, 183, 222/189.07; 210/244; 220/23.87, 256

(56) References Cited

U.S. PATENT DOCUMENTS

| | | | | |
|---|---|---|---|---|
| 3,140,799 A | * | 7/1964 | Mehr | 222/131 |
| 4,555,339 A | * | 11/1985 | Graves et al. | 210/244 |
| 5,015,112 A | | 5/1991 | Arnold | |
| 5,322,196 A | * | 6/1994 | Burton | 210/244 |

* cited by examiner

*Primary Examiner*—Philippe Derakshani
(74) *Attorney, Agent, or Firm*—Hahn Loeser & Parks, LLP

(57) ABSTRACT

A spill-proof, heat-resistant container to hold used left-over cooking oil and grease. The container comprises an outer container, an inner container conformably shaped and dimensioned to be received within the outer container, and a removable lid for closing an opening of the inner container. The removable lid includes an aperture therethrough and a valve which blocks the aperture when the container is upset.

20 Claims, 3 Drawing Sheets

HOUSEHOLD GREASE STORAGE CONTAINER

This application claims benefit of Provisional Application No. 60/275,458 filed Mar. 13, 2001.

The present invention relates to the collection, storage, and disposal of cooking oil and grease. More specifically this invention relates to a spill-proof, heat-resistant container to hold used left-over cooking oil and grease.

BACKGROUND OF THE INVENTION

Grease typically accumulates during the preparation of many types of food and sometime during the preparation of a meal there arises a need to discard or store the accumulated cooking grease.

It is common practice to store the grease in jars, cans, plastic cups, or other containers. Besides being unsightly, these containers can break or leak because they were not intended to accommodate a hot substance. The escaping grease can cause potentially serious injuries or even start a fire. In addition, these containers typically do not have lids and can be knocked over causing another potential hazard.

Disposing of the grease can also be a problem. Pouring the grease into a plastic garbage bag is undesirable because of the odors and because the hot grease may break through the plastic bag. The grease will soak through a paper bag. Pouring the grease down the sink drain is a major source of drain clogs and plumbing difficulties.

Therefore, it would be desirable to have a covered container for collecting grease and oil for later reuse or disposal. This container would have a sealed lid to keep the contents from spilling and spreading unpleasant odors. Additionally, the container would be inexpensive enough that it could be thrown away when it was filled.

The prior art discloses containers which are too expensive to be disposable thus they must be emptied and cleaned, making them inefficient for personal use. Additionally, many of these containers do not have sealed lids, thus the contents can be spilled out if the container is knocked over. The present invention overcomes all of these problems by providing an inexpensive, spill-proof container for grease storage and disposal.

SUMMARY OF THE INVENTION

The present invention provides a novel device for safely and effectively storing and disposing of cooking grease or oil. The present invention overcomes the problems described in the prior art associated with the normal storage and disposal of grease and oil by providing a grease container comprising an outer container, an inner container conformably shaped and dimensioned to be received within the outer container, and a removable lid for closing an opening of the inner container. The removable lid includes an aperture therethrough and a valve which blocks the aperture when the container is upset.

These and other objects of the present invention will become apparent in the detailed description of the drawings.

BRIEF DESCRIPTION OF THE DRAWINGS

A better understanding of the present invention will be had when reference is made to the accompanying drawings, wherein.

DETAILED DESCRIPTION OF THE DRAWINGS

Figure 1:
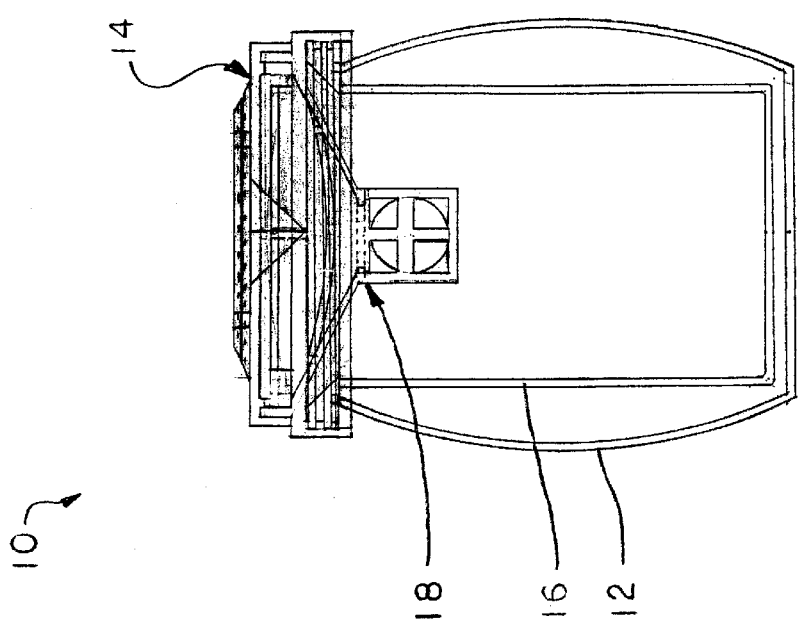
FIG. 1 is a front partial cross-sectional view of the preferred embodiment of the invention.

In the following detailed description of the present invention, reference is made to the accompanying drawings which, in conjunction with this detailed description, illustrate and describe an apparatus for the storage and disposal of cooking grease or oil. Referring to FIG. 1, a household grease storage container 10 is depicted which comprises an outer container 12 and an outer lid 14 which enclose inner container 16 and inner lid assembly 18. The inner container 16 has an outer diameter and height that are slightly smaller than the corresponding dimensions of the outer container 12. The outer container 12 functions to add strength and durability to the inner container 16 while protecting a user from the high temperatures of hot cooking grease placed within inner container 16. The outer container 12 also serves to keep the inner container 16 and cooking grease out of view. The outer container 12 may employ a decorative outer finish that serves to distinguish it from other containers, and it may be labeled as a further indication of the intended contents of the container 10. Container 10 is preferably composed of a heat-resistant carbonized plastic material, stainless steel, or any other suitable material capable of withstanding temperatures of 400–500° F.

Figure 3:
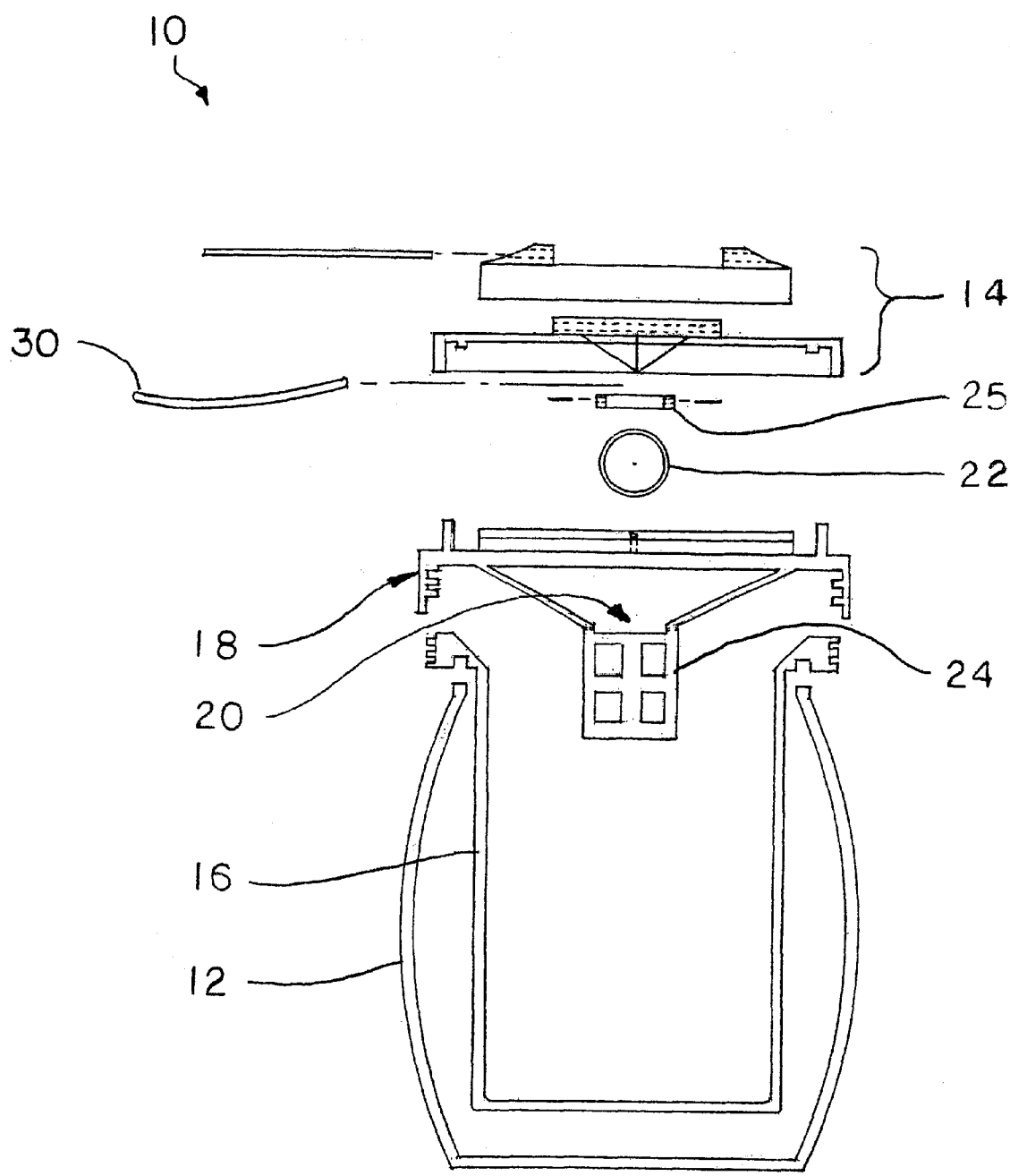
FIG. 3 is an exploded front partial cross-sectional view of the preferred embodiment of the invention as shown in FIG. 1.

Inner container 16 is generally cylindrical in shape and is covered at an upper end by inner lid assembly 18. Inner lid assembly 18 preferably is funnel shaped to allow the grease to be easily poured into inner container 16 through an aperture 20 at the bottom of the lid assembly 18 as best shown in FIG. 3. This is especially helpful when pouring grease into container 10 from an awkward source such as a frying pan or the like.

Referring still to FIG. 3, the present invention incorporates a safety valve feature to prevent accidental spillage of contained grease. The bottom of the inner lid assembly 18 comprises a check ball 22 housed in a check ball housing or ball housing cage 24 positioned directly beneath aperture 20 and secured in ball housing cage 24 by washer 25. The check ball 22 is positioned to allow grease to enter through aperture 20 of the inner lid assembly 18 when container 10 is in an upright position or in a slightly tilted position such as when pouring in a decanter style. It is noted that the check ball 22 is typically made of a material heavier than the grease such that the check ball 22 will be positioned at the bottom of the ball cage housing 24 when the container 10 is in an upright position or in a slightly tilted position such as during pouring. When the container 10 is upset or rotated generally 90 degrees or beyond, the check ball 22 will move toward the aperture 20 and seal the container 10. The invention is not limited to such a valve design. It is contemplated that any valve may be used that will seal the container when the container is upset, for example a flapper valve, floating ball, etc.

Figure 2:
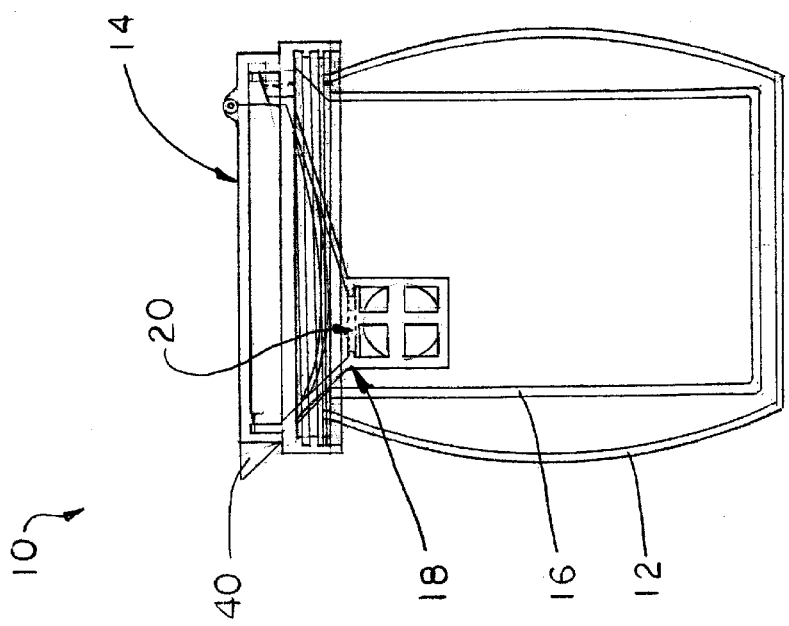
FIG. 2 is a side partial cross-sectional view of the preferred embodiment of the invention as shown in FIG. 1.

Aperture 20 is shown offset from the central axis of the inner container 16 as best shown in FIG. 2. Although not required, this preferred positioning provides additional help when pouring grease into container 10 from an awkward source and helps prevent overspill.

Figure 4:
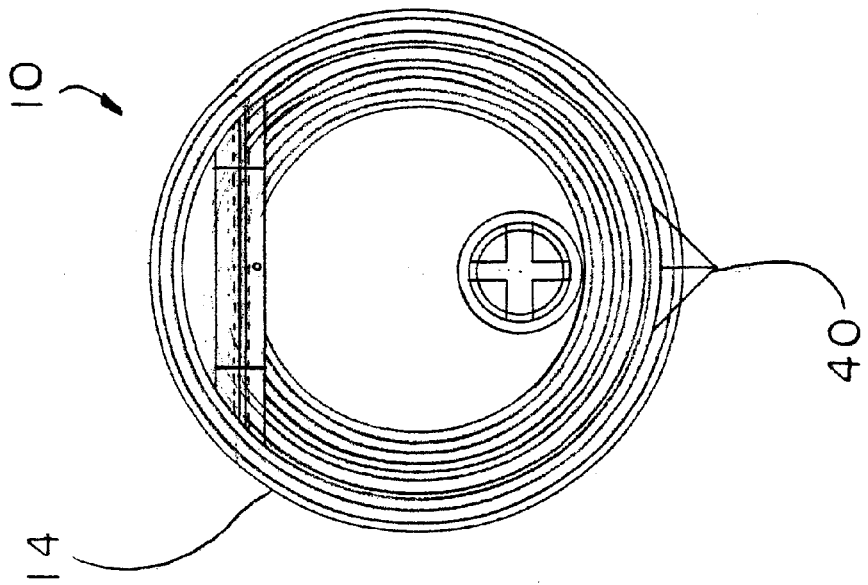
FIG. 4 is a top elevational view of the preferred embodiment of the invention as shown in FIG. 1.

Referring to FIG. 2, the container 10 is provided with a mating outer lid 14 which sits upon the container 10 and covers the opening to inner container 16. Outer lid 14 is composed of the same material as the inner and outer containers 16 and 12, although it need not be, and it may be omitted from the pot altogether without avoiding the inventive concepts herein disclosed. The outer lid 14 is conformably shaped to forcibly fit within the mouth of the inner container 16 so as to create an air-tight seal to prevent leaking or spilling. As best shown in FIGS. 3 and 4, outer lid 14 can comprise multiple parts to enable the lid to be fixably attached while able to flip up and away from container 10 to allow access to inner lid assembly 18.

Figure 5:
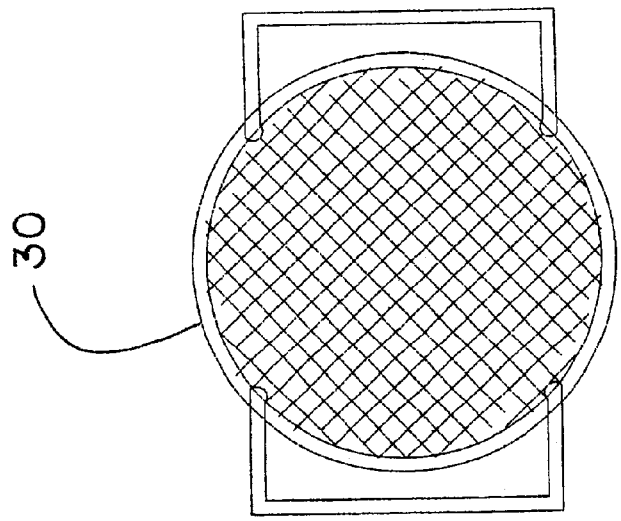
FIG. 5 is a top plan view of the screen used in a preferred embodiment of the container of the present invention.

The container 10 can also be equipped with a removable strainer screen 30 as best shown in FIGS. 3 and 5. The strainer 30 is positionable over the inner lid assembly 18 as shown in FIG. 3. The strainer 30 is meant to catch food particles and other residue contaminants from entering into the container 10. After the grease is poured into container 10 through strainer 30, the residue remaining on strainer 30 is discarded. The strainer 30 allows the grease or oil that is stored in the container to be re-used, if desired. Strainer 30 can be shaped and dimensioned to allow the outer lid 14 to be matingly placed on the container 10 with the strainer 30 still in place.

The container comprises a spout 40 which allows for easy pouring and prevents overspill of the contents of the container 10 as best shown in FIGS. 2 and 4. Although not shown, container 10 may also include a handle to allow container 10 to be handled with greater ease.

Container 10 is preferably fabricated using readily available and commonly known techniques and materials of sufficiently inexpensive cost to enhance use as a disposable item that can be discarded along with the collected grease at a reasonable cost to the user. The inner and outer containers 16 and 12 can also be varied in size to hold from one quart to up to four gallons of grease. Thus, the container 10 can be useful for personal home use as well as commercial use, such as in restaurants or other institutional establishments.

The illustrated embodiment of a cooking grease storage and disposal container 10 may be placed on the kitchen counter or in a restaurant and remain available for collecting cooking grease as the grease accumulates. The strainer 30 may be used as desired or removed. The size of the container 10 can also be varied to accommodate use in a commercial setting or personal use in a home. Further, when the container is full, the grease can either be discarded by removing the inner lid assembly 18 and pouring the grease via the spout 40 or the entire container 10 can be discarded. Once the grease has cooled, the congealed grease can be removed by scooping out the grease and discarding it in a plastic trash bag or the like. The outer and inner lids 14, 18 can be removed for better access to the inner container 16, allowing the grease to be more easily removed from container 10 and discarded.

Although the present invention has been described above in detail, the same is by way of illustration and example only and is not to be taken as a limitation on the present invention.

What is claimed is:

1. A grease container comprising:
   an outer container;
   an inner container conformably shaped and dimensioned to be received within the outer container;
   a removable lid for closing an opening of the inner container;
   an aperture through the removable lid; and
   a valve which blocks the aperture when the container is upset.

2. The grease container of claim 1, wherein the inner container and the removable lid are made of heat resistant materials.

3. The grease container of claim 1, wherein the valve comprises a ball positioned within a cage housing secured to the removable lid and located below the aperture.

4. The grease container of claim 3, wherein the ball is secured within the cage housing by a washer having an inner diameter smaller than the outside diameter of the ball.

5. The grease container of claim 1, wherein the removable lid is funnel shaped with the aperture formed at the bottom of the removable lid.

6. The grease container of claim 1, wherein the aperture in the removable lid is formed offset from the cylindrical axis of the container.

7. The grease container of claim 1 further comprising a second lid removably positioned overtop of the original removable lid and providing a seal of the container.

8. The grease container of claim 1 further comprising a removable strainer screen removably positioned over the removable lid.

9. The grease container of claim 1, wherein the removable lid includes a spout.

10. The grease container of claim 1, wherein the outer container is thermally insulated from the inner container.

11. A spill resistant grease decanter comprising:
    an outer container;
    an inner container conformably shaped and dimensioned to be received within the outer container;
    a removable lid for closing an opening of the inner container;
    an aperture through the removable lid;
    a valve which blocks the aperture when the container is upset;
    wherein the removable lid is funnel shaped with the aperture formed at the bottom of the removable lid;
    wherein the valve comprises a ball positioned and secured within a cage housing secured to the removable lid and located below the aperture, the aperture having a diameter smaller than the diameter of the ball, the ball movable against the aperture to seal the container against spillage when the decanter is upset.

12. The spill resistant grease decanter of claim 11, wherein the inner container and the removable lid are made of heat resistant materials.

13. The spill resistant grease decanter of claim 11, wherein the aperture in the removable lid is formed offset from the cylindrical axis of the decanter.

14. The spill resistant grease decanter of claim 11 further comprising a second lid removably positioned overtop of the original removable lid and providing a seal of the decanter.

15. The spill resistant grease decanter of claim 11 further comprising a removable strainer screen removably positioned over the removable lid.

16. The spill resistant grease decanter of claim 11, wherein the removable lid includes a spout.

17. The spill resistant grease decanter of claim 11, wherein the outer container is thermally insulated from the inner container.

18. A grease container comprising:
    an outer container;
    an inner container conformably shaped and dimensioned to be received and removably secured within the outer container, a removable lid for closing an opening of the inner container, an aperture through the lid, a valve which blocks the aperture when the container is upset; and the inner container is made of an inexpensive, disposable, heat resistant material.

19. The grease container of claim 18, wherein the outer container is thermally insulated from the inner container.

20. The grease container of claim 18, wherein the valve comprises a ball positioned and secured within a cage housing secured to the removable lid and located below the aperture, the aperture having a diameter smaller than the diameter of the ball, the ball movable against the aperture to seal the container against spillage when the container is upset.

* * * * *